(12) United States Patent
Wouters et al.

(10) Patent No.: US 12,241,597 B2
(45) Date of Patent: Mar. 4, 2025

(54) LED FILAMENT LAMP

(71) Applicant: SIGNIFY HOLDING B.V., Eindhoven (NL)

(72) Inventors: Vincent Arnoud Wouters, Helmond (NL); Bertrand Johan Edward Hontele, Breda (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/639,074

(22) PCT Filed: Sep. 2, 2020

(86) PCT No.: PCT/EP2020/074466
§ 371 (c)(1),
(2) Date: Feb. 28, 2022

(87) PCT Pub. No.: WO2021/043823
PCT Pub. Date: Mar. 11, 2021

(65) Prior Publication Data
US 2022/0299172 A1    Sep. 22, 2022

(30) Foreign Application Priority Data

Sep. 6, 2019   (EP) ..................... 19195817
Sep. 6, 2019   (EP) ..................... 19195974

(51) Int. Cl.
*F21K 9/232*   (2016.01)
*F21K 9/238*   (2016.01)
(Continued)

(52) U.S. Cl.
CPC .............. *F21K 9/232* (2016.08); *F21K 9/238* (2016.08); *H05B 45/10* (2020.01); *H05B 45/20* (2020.01);
(Continued)

(58) Field of Classification Search
CPC ........ F21K 9/232; F21K 9/238; H05B 45/357
See application file for complete search history.

(56) References Cited

U.S. PATENT DOCUMENTS 5,463,280 A * 10/1995 Johnson .................. F21K 9/232
  362/800
9,420,644 B1   8/2016 Shum
(Continued)

FOREIGN PATENT DOCUMENTS

CN    107429895 A    12/2017
GB      2561145 A    10/2018
(Continued)

*Primary Examiner* — William N Harris

(57) ABSTRACT

The invention provides a LED filament lamp (10) comprising: an envelope (11) enclosing a chamber (13) sealed with a stem (12), wherein the stem extends into said chamber; a LED filament structure (14) with at least two individually controllable segments (141-145); a controller (15) configured to receive a control signal and control each of the at least two individually controllable segments based on said control signal, wherein the LED filament structure (14) and the controller (15) are arranged within the chamber (13); a driver circuit (16) arranged outside the chamber, wherein the driver circuit comprises two powerlines (161, 162) extending through the stem (12) or the envelope (11) for powering the LED filament structure (14) and the controller (15), wherein the driver circuit (16) is configured to convey said control signal to the controller (15) via a control line (163) extending through the stem or the envelope.

17 Claims, 2 Drawing Sheets

(51) Int. Cl.
    *F21Y 103/10*    (2016.01)
    *F21Y 115/10*    (2016.01)
    *H05B 45/10*    (2020.01)
    *H05B 45/20*    (2020.01)
    *H05B 45/357*    (2020.01)

(52) U.S. Cl.
    CPC ........ *H05B 45/357* (2020.01); *F21Y 2103/10* (2016.08); *F21Y 2115/10* (2016.08)

(56) References Cited

U.S. PATENT DOCUMENTS

| | | | |
|---|---|---|---|
| 11,187,387 B1 * | 11/2021 | Yan | F21K 9/238 |
| 2013/0271987 A1 | 10/2013 | Hussell et al. | |
| 2017/0012177 A1 * | 1/2017 | Trottier | F21K 9/00 |
| 2018/0106435 A1 | 4/2018 | Wu et al. | |
| 2018/0328543 A1 | 11/2018 | Bergmann et al. | |
| 2019/0017659 A1 | 1/2019 | Dendorfer et al. | |
| 2020/0166182 A1 * | 5/2020 | Yeung | H01L 27/153 |
| 2022/0146057 A1 * | 5/2022 | Yan | F21V 29/85 |

FOREIGN PATENT DOCUMENTS

| | | | |
|---|---|---|---|
| JP | 2011204637 A | 10/2011 | |
| JP | 2019530142 A | 10/2019 | |

* cited by examiner

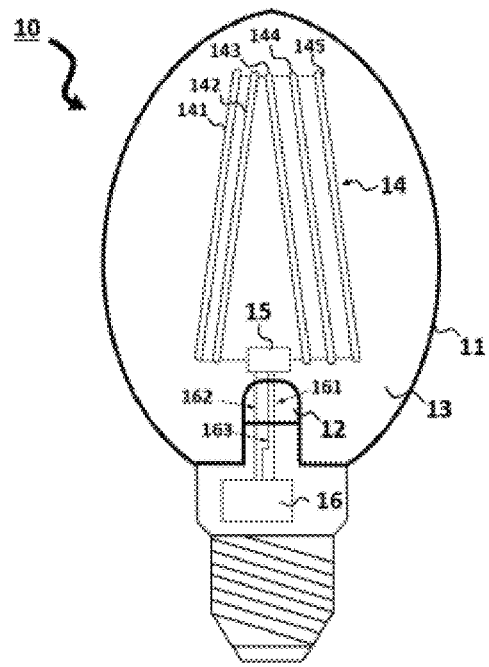
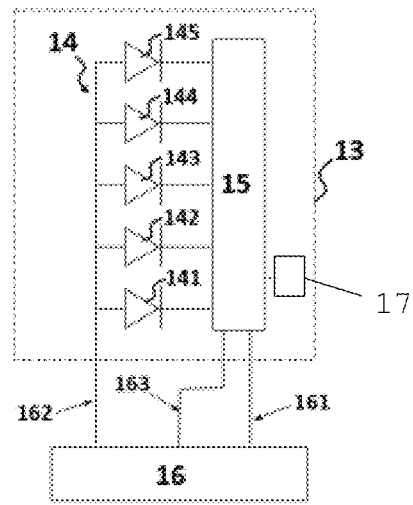
FIG.1A.   FIG.1B.
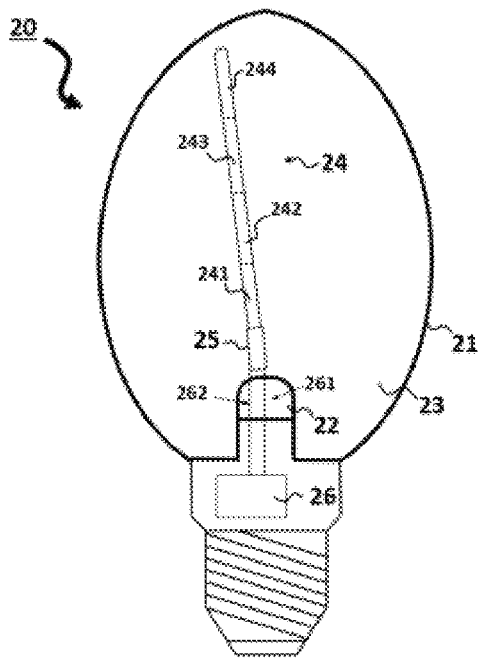
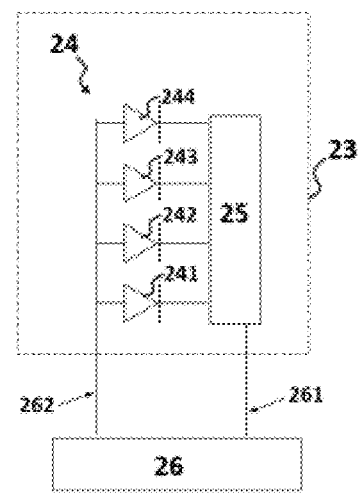
FIG.2A.   FIG.2B.

LED FILAMENT LAMP

CROSS-REFERENCE TO PRIOR APPLICATIONS

This application is the U.S. National Phase application under 35 U.S.C. § 371 of International Application No. PCT/EP2020/074466, filed on Sep. 2, 2020, which claims the benefit of European Patent Application No. 19195817.2, filed on Sep. 6, 2019, and which claims the benefit of European Patent Application No. 19195974.1, filed on Sep. 6, 2019. These applications are hereby incorporated by reference herein.

FIELD OF THE INVENTION

The invention relates to LED filament lamp; to a luminaire comprising said LED filament lamp; and to a method of driving such a LED filament lamp.

BACKGROUND OF THE INVENTION

Incandescent lamps are increasingly being replaced by e.g. LED filament lamps, because LED filament lamps provide the same decorative look as incandescent lamps, but with the benefits associated with LED based lighting. Therefore, the infrastructure for manufacturing incandescent lamps based on glass bulbs may still be utilized, wherein the conventional filament of an incandescent lamp is then replaced with e.g. at least one LED filament, or e.g. other type of LED light sources.

Consequently, considering the case for LED filament lamps, such LED filament lamps are commonly powered through a wired electrical connection. Most commonly, said wired electrical connection consists thereby of at least two electrical wires fed through the glass stem of the bulb. Said two wires may be sufficient to control simple lighting operations. Difficulty in manufacturing increases, however, with increasing amount of wires through the stem, such as e.g. three or four electrical connections.

Moreover, LED based lighting may be characterized by multi-channel control, such as controlling multiple segments of a LED light source for e.g. providing tunable white or individual color control. Hence, such multi-channel control may also be introduced to LED filament lamps. Multi-channel control may thereby also be phrased as multi-segment control. US2018/328543A1 and U.S. Pat. No. 9,420,644B1 disclose examples of a LED filament lamp.

However, if additional control of the segments of the LED filament(s) is required, the number of electrical connections through the glass stem of the bulb needs to increase. For N segments, N+1 electrical connections are required through the glass stem. For example, six electrical connections through the glass stem are required to control five segments individually and independently. This is a clear disadvantage, because an increased number of electrical connections through the glass stem adds costs to manufacturing, adds complexity and a burden to the proven conventional manufacturing methods, and reducing the reliability of the stem of the bulb.

SUMMARY OF THE INVENTION

It is an object of the invention to provide an improved LED filament lamp, which facilitates multi-channel control, but which at least alleviates the associated problems and disadvantages mentioned above. Thereto, the invention provides a LED filament lamp comprising: an envelope enclosing a chamber sealed with a stem, wherein the stem extends into said chamber; a LED filament structure with at least two individually controllable segments; a controller configured to receive a control signal and control each of the at least two individually controllable segments based on said control signal, wherein the LED filament structure and the controller are arranged within the chamber; a driver circuit arranged outside the chamber, wherein the driver circuit comprises two powerlines extending through the stem or the envelope for powering the LED filament structure and the controller, wherein the driver circuit is configured to convey said control signal to the controller via a control line extending through the stem or the envelope.

In an embodiment, the control line may be a separate control line extending through the stem. Such a separate control line is thereby independent and separate from the two powerlines. The two powerlines may be phrased as power wires as well. However, in an alternative embodiment, at least one of the two powerlines may be the control line, or (phrased differently) may be configured as the control line. Thus at least one of the two powerlines serves as said control line. Thus, the control signal may be conveyed via at least one of the two powerlines. In the latter embodiment, the driver circuit may be configured to transmit said control signal to the controller via Power Line Communication (PLC).

As mentioned, the LED filament lamp comprises an envelope. The envelope may for example be a glass bulb. The envelope seals a chamber together with the stem. The chamber may e.g. be a gas tight chamber throughout the application. The stem may also be made of glass. The stem extends into said chamber. The LED filament lamp further comprises a LED filament structure, a controller, and a driver circuit. The driver circuit comprises two powerlines extending through the stem for powering the LED filament structure and the controller. The driver circuit is arranged outside the chamber, whereas the LED filament structure and the controller are both arranged within the chamber. The LED filament structure comprises at least two individually controllable segments. Said segments may also be phrased as channels or strings. The controller is configured to receive a control signal and control each of the at least two individually controllable segments based on said control signal.

Said at least two individually controllable segments may alternatively be at least three individually controllable segments.

According to the invention, the controller is configured to control each of the at least two individually controllable segments based on said control signal. Hence, phrased differently, the controller may be configured to individually control each of the at least two individually controllable segments based on said control signal. The control signal may be phrased as a control command, or as a control message, throughout. The control signal may comprise or adhere to a messaging protocol. The control signal may be arranged for individually controlling at least one individually controllable segment of the at least two individually controllable segments of the LED filament structure. The driver circuit and the controller may communicate with each other via the control line. Said communication may in examples be bi-directional.

Hence, in examples, the invention provides a LED filament lamp comprising: an envelope enclosing a chamber sealed with a stem, wherein the stem extends into said chamber; a LED filament structure with at least two individually controllable segments; a controller configured to receive a control signal and to individually control each (or alternatively: at least one) of the at least two individually controllable segments based on said control signal, wherein the LED filament structure and the controller are arranged within the chamber; a driver circuit arranged outside the chamber, wherein the driver circuit comprises two powerlines extending through the stem or the envelope for powering the LED filament structure and the controller, wherein the driver circuit is configured to convey said control signal to the controller via a control line extending through the stem or the envelope.

Therefore, because the invention provides the controller within the chamber, and because the driver circuit conveys said control signal to the controller via a control line extending through the stem, the control line being either a separate control line or at least one of the two powerlines, the present invention enables multi-segment control of the LED filament structure with the at least two individually controllable segments without having to need more than respectively two or three electrical connections through the stem.

For example, if the LED filament structure has five individually controllable segments, and if the control line is e.g. a separate control line, then only three electrical connections are required through the stem to control said five individually controllable segments; whereas previously six electrical connections were required. Hence, in a preferred embodiment, the LED filament structure may comprise five individually controllable segments.

Hence, the present invention provides a clear advantage, particularly in reducing the complexity and/or costs of manufacturing such multi-channel LED filament lamps, wherein also the reliability of the seal of the stem is increased (as less wires are required to be manufactured through the stem).

The driver circuit may comprise a driver and/or a main control circuit (or: upstream control unit). The main control circuit may be arranged to control the LED filament structure via said controller; for example, in operation, by generating and/or receiving control signals and subsequently conveying said control signals to the controller (within the chamber). The driver circuit may further comprise a receiver or transceiver for receiving control messages, the main control circuit may be in communication with said receiver and receive said control messages and covert said control messages into control signals according to the invention. The receiver may for example be a RF module, e.g. operate on wireless modalities such as Bluetooth, ZigBee, RF, NFC, RFID, Wi-Fi, or Li-Fi, VLC, IR, etc. Moreover, in aspects, the LED filament lamp may comprise a base comprising (at least partly) a screw, the base arranged outside the chamber and in connection with the stem, wherein the base comprises the driver circuit. Hence, in aspects, the LED filament lamp may comprise wireless connectivity, or be a wirelessly connected LED filament lamp.

Hence, in an embodiment, the driver circuit may comprise a receiver for receiving a control message, wherein the control command is a converted control message. The control message may be a wireless control message, and the receiver may be a wireless receiver configured to receive the wireless control message.

In an embodiment, each segment of the at least two individually controllable segments may be configured to output a different lighting characteristic. In a further embodiment, the lighting characteristic may be one of: a color, a color temperature, or an intensity. Alternatively, in some examples, at least two segments of the at least two individually controllable segments may output a different lighting characteristic.

In an embodiment, the LED filament structure comprises at least two LED filaments, wherein each LED filament of the at least two LED filaments comprises a respective segment of the at least two individually controllable segments. Hence, each respective LED filament is embodied as an individually controllable segment. For example, if the LED filament structure comprises three LED filaments, the first LED filament may be emitting a warm-white spectrum, the second LED filament may be emitting a white spectrum, and the third embodiment may be emitting a cold-white spectrum; thereby rendering three different color temperature segments. Hence, the respective LED filaments may comprise a different phosphor coating.

However, in an alternative embodiment, the LED filament structure may comprise a single LED filament comprising the at least two individually controllable segments. For example, if the LED filament structure comprises a single LED filament, the single LED filament may comprise three different segments, such as a segment emitting respectively red, blue and green; thereby rendering three different color segments with a single LED filament.

In an embodiment, the controller may be configured to decode the received control signal into a decoded control signal and control each of the at least two individually controllable segments based on said decoded control signal. Such an embodiment may make use of protocols and coding schemes known in the art to establish a control signal which can subsequently be decoded by the controller, such as Amplitude Modulation, Pulse-Width-Modulation, or Time-Division Multiplexing.

In an embodiment, the LED filament structure and the controller may be mounted on the stem; or the LED filament structure may be mounted on the stem and the controller is part of the LED filament structure.

The controller may also provide signals back to the driver circuit through said advantageously limited amount of electrical connections through the stem. Hence, in an embodiment, the controller is configured to determine a monitoring signal indicative of a status of at least one of the at least two controllable segments and to convey said monitoring signal via said control line to the driver circuit. Such an embodiment embodies bi-directional communication.

It is a further object of the invention to provide an improved luminaire (or lighting system) according to the invention, which at least alleviates the problems and disadvantages mentioned above. Thereto, the invention further provides a luminaire comprising a socket for powering a lighting device and the LED filament lamp according to the invention, wherein the LED filament lamp is arranged within the socket. Thereby, advantages and/or embodiments applying to the LED filament lamp according to the invention may mutatis mutandis apply to said luminaire according to the invention.

It is a further an object of the invention to provide an improved method of driving a LED filament lamp, which at least alleviates the problems and disadvantages mentioned above. Thereto, the invention provides a method of driving a LED filament lamp, wherein the LED filament lamp comprises an envelope enclosing a chamber sealed with a stem and a LED filament structure with at least two individually controllable segments, wherein the stem extends into said chamber, and wherein the LED filament structure and the controller are arranged within the chamber; wherein the method comprises: powering, by a driver circuit arranged outside the chamber, the controller; conveying, by the driver circuit, a control signal to the controller via a control line extending through the stem; receiving, by the controller, said control signal and controlling each of the at least two controllable channels based on said control signal. Thereby, advantages and/or embodiments applying to the LED filament lamp according to the invention may mutatis mutandis apply to said method according to the invention.

In an embodiment, the control line is a separate control line extending through the stem; or wherein at least one of the two powerlines is the control line. In an embodiment, each segment of the at least two individually controllable segments is configured to output a different lighting characteristic; wherein the lighting characteristic is one of: a color, a color temperature, or an intensity. In an embodiment, the method comprises decoding the received control signal into a decoded control signal, and controlling each of the at least two individually controllable segments based on said decoded control signal. In an embodiment, the method comprises transmitting, by the driver circuit, said control signal to the controller by means of Power Line Communications (PLC). In an embodiment, the method comprises: determining, by the controller, a monitoring signal indicative of a status of at least one of the at least two controllable segments; and conveying said monitoring signal via said control line to the driver circuit.

In aspects, it may be a further object of the invention to provide an improved multi-channel light source, which facilitates multi-channel control, but which at least alleviates the associated problems and disadvantages in the background section related to LED filament lamps. Thereto, the invention provides a multi-channel light source comprising: an envelope enclosing a chamber sealed with a stem, wherein the stem extends into said chamber; a LED structure with at least two individually controllable segments; a controller configured to receive a control signal and control each of the at least two individually controllable segments based on said control signal, wherein the LED structure and the controller are arranged within the chamber; a driver circuit arranged outside the chamber, wherein the driver circuit comprises two powerlines extending through the stem for powering the LED structure and the controller, wherein the driver circuit is configured to convey said control signal to the controller via a control line extending through the stem. Thereby, advantages and/or embodiments applying to the LED filament lamp according to the invention may mutatis mutandis apply to said multi-channel light source according to the invention.

Since the controller is configured to receive said control signal, the controller may comprise a logic. The controller may be a programmable controller. The controller may be phrased as a processor. The controller may process (or: analyze, or: evaluate) said control command. The controller may be configured to (individually) control each of the at least two individually controllable segments based on processing (or: analyzing, or: evaluating) said control command. The controller may be an autonomous controller. The controller may comprise computational power. The control command may be configured to perform multi-channel lighting control, by e.g. individually controlling the at least two individually controllable LED segments.

In further aspects, the LED filament lamp according to the invention may comprise a sensor configured to provide a sensor signal, wherein the sensor is arranged within the chamber, wherein the controller is configured to receive the sensor signal and control each of the at least two individually controllable segments based on said control command and said sensor signal. Since the sensor is directly coupled to the controller, and not to the driver circuit, the controller may autonomously control the LED filament structure based on both the control command and the sensor signal, without the LED filament requiring another line (for the sensor signal) through the stem or the envelope. Hence, reiterating, in examples, the invention provides: A LED filament lamp comprising: an envelope enclosing a chamber sealed with a stem, wherein the stem extends into said chamber; a LED filament structure with at least two individually controllable segments; a controller configured to receive a control command and control each of the at least two individually controllable segments based on said control command, wherein the LED filament structure and the controller are arranged within the chamber; a driver circuit arranged outside the chamber, wherein the driver circuit comprises two powerlines extending through the stem or the envelope for powering the LED filament structure and the controller, wherein the driver circuit is configured to convey said control command to the controller via a (e.g. separate) control line extending through the stem or the envelope.

BRIEF DESCRIPTION OF THE DRAWINGS

The invention will now be further elucidated by means of the schematic non-limiting drawings:

FIGS. 1A & 1B depict schematically an embodiment of a LED filament lamp according to the invention, wherein the control line is a separate control line extending through the stem;

FIGS. 2A & 2B depict schematically an embodiment of a LED filament lamp according to the invention, wherein at least one of the two powerlines is the control line;

DETAILED DESCRIPTION OF THE EMBODIMENTS

Figure 3:
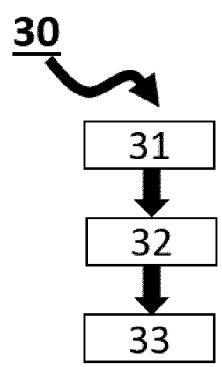
FIG. 3 depicts schematically an embodiment of a method according to the invention.

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

As partly mentioned before, LED filament lamps increasingly replace conventional light bulbs. The manufacturing of LED filament lamps may therefore utilize the existing infrastructure for conventional light bulbs. Therefore, LED filament lamps often comprise an envelope sealed with a stem, but wherein the stem has only two (conventional) electrical connections to the chamber enclosed by the envelope. However, LED filament lamps may comprise a LED filament structure with multiple individually controllable segments, such as e.g. LED filaments with different respective color temperatures or a single LED filament with different color strings. This means that for N individually controllable segment, the LED filament lamp requires N+1 wires through the stem for enabling individual control of said segments. This is a clear disadvantage, because an increased number of electrical connections through the glass stem adds costs to manufacturing, adds complexity to the stem design, and a clear burden to the established manufacturing procedures used, and even further reduces the reliability of the stem of the bulb (i.e. e.g. a metal-glass bonding of the stem).

As mentioned, the present invention advantageously provides a multi-channel (or multi-segment) LED filament lamp, wherein the complexity and/or costs of manufacturing said multi-channel LED filament lamp is reduced, but also the reliability of the seal of the stem is improved (as less electrical connections are required through the stem for enabling the multi-channel control of the LED filament lamp).

FIGS. 1A & 1B depict schematically an embodiment of a LED filament lamp 10 according to the invention. FIG. 1B depicts a scheme of the LED filament lamp 10 components. The LED filament lamp 10 comprises an envelope 11, a stem 12, a LED filament structure 14, a controller 15, a sensor 17 and a driver circuit 16. The LED filament lamp 10 also has a base comprising a screw, so as to screw said LED filament lamp in a socket. The driver circuit 16 is thereby arranged within the base.

The envelope 11 is a glass bulb. The stem 12 is a glass stem. The envelope 11 seals a chamber 13 together with the stem 12. The stem 12 extends into said chamber 13. Said chamber may e.g. be filled with gasses commonly known for filling light bulbs, such as e.g. nitrogen, argon or helium. Such gasses may also improve the thermal properties of the LED filament lamp and improve heat transfer. The envelope and/or stem may alternatively be made of any other material, such as a polymer or a ceramic.

The LED filament structure 14, the sensor 17 and the controller 15 are mounted on the stem 12 and are thereby arranged within the chamber 13. The LED filament structure 14 comprise five individually controllable LED filaments 141, 142, 143, 144, 145; each of said five LED filaments comprising a respective individually controllable segment. Said segments may also be phrased as channels or strings. Each segment of said individually controllable segments (thus each LED filament) outputs a different lighting characteristic. Here, the lighting characteristic is color temperature. Hence, the first LED filament 141 has a first color temperature, the second LED filament 142 has a second color temperature, the third LED filament 143 has a third color temperature, the fourth LED filament 144 has a fourth color temperature, and the fifth LED filament 145 has a fifth color temperature. The color temperatures may differ due to the LED filaments having a different phosphor layer (coating) and/or LED light sources. The color temperatures may range in tones between e.g. warm-white and cold-white. Alternatively, in some examples, at least two segments of the individually controllable segments may output a different lighting characteristic.

The driver circuit 16 comprises two powerlines 161, 162 extending through the stem 12 that power the LED filament structure 14 and the controller 15. The driver circuit comprises a main control circuit (not explicitly referenced to). The main control circuit receives power and is operationally arranged to control the LED filament structure by means of conveying control signals. The driver circuit 16 also comprises a separate control line 163 extending through the stem 12 and connecting to the controller 15. The driver circuit 16 is arranged outside the chamber 14. The driver circuit 16 conveys a control signal to the controller 15 via said control line 163. The controller 15 is arranged to receive said control signal and, based on said control signal, control each of the five individually controllable LED filaments 141, 142, 143, 144, 145 and their respective individually controllable segment.

Moreover, in aspects, the main control circuit comprised by the driver circuit 16 may convey a coded signal to the controller 15. The controller 15 may be configured to decode the received control signal into a decoded control signal, and thereafter control each of the five individually controllable LED filaments 141, 142, 143, 144, 145 and their respective individually controllable segment based on said decoded control signal. The driver circuit may thereby utilize known techniques, such as Amplitude Modulation, Pulse-Width-Modulation, or Time-Division Multiplexing.

All in all, because the invention provides the controller 15 within the chamber 13, and because the driver circuit 16 conveys said control signal to the controller 15 via the separate control line 163 extending through the stem 12, the LED filament lamp 10 enables multi-segment control of the LED filament structure 14 with the five individually controllable LED filaments 141, 142, 143, 144, 145 and their respective individually controllable segment, without having to need more than three electrical connections through the stem 12.

FIGS. 2A & 2B depict schematically an embodiment of a LED filament lamp 20 according to the invention. FIG. 2B depicts a scheme of the LED filament lamp 20 components. The LED filament lamp 20 comprises an envelope 21, a stem 22, a LED filament structure 24, a controller 25, and a driver circuit 26.

The envelope 22 is a glass bulb. The stem 22 is a glass stem. The envelope 21 seals a chamber 23 together with the stem 22. The stem 22 extends into said chamber 23. The envelope and/or stem may alternatively be made of any other material, such as a polymer or a ceramic.

The LED filament structure 24 is mounted on the stem 22. The LED filament structure 24 is a single LED filament comprising four individually controllable channels 241, 242, 243, 244. Said segments may also be phrased as channels or strings. Each segment of said individually controllable segments 241, 242, 243, 244 outputs a different lighting characteristic. Here, the lighting characteristic is color. Hence, the first segment 241 may comprise a red LED light source, the second segment 242 may comprise a blue LED light source, the third segment 243 may comprise a green LED light source, and the fourth segment 244 may comprise warm-white LED light source (e.g. with a phosphor layer).

Here, the LED filament structure 24 comprises the controller 25. Alternatively, the controller may be arranged on the stem. The LED filament structure 24 and the stem 22 are thus arranged within the chamber 23.

The driver circuit 26 comprises two powerlines 261, 262 extending through the stem 22 that power the LED filament structure 24 and the controller 25. The driver circuit 26 is arranged outside the chamber 24. The driver circuit 26 transmits a control signal to the controller 25 via at least one of said powerlines 261, 262 by means of Power Line Communication (PLC). The driver circuit may thereby utilize known techniques, such as Amplitude Modulation, Pulse-Width-Modulation, or Time-Division Multiplexing. The controller 25 is arranged to receive said control signal and, based on said control signal, control each of the four individually controllable segments 241, 242, 243, 244.

All in all, because the invention provides the controller 25 within the chamber 23, and because the driver circuit 26 conveys said control signal to the controller 25 via the two powerlines 162, 161 extending through the stem 22, the LED filament lamp 20 enables multi-segment control of the LED filament structure 24 with the four individually controllable LED segments 241, 242, 243, 244, without having to need more than two electrical connections through the stem 22.

In an embodiment, not depicted, the LED filament lamp according to the invention is partly similar to the embodiments depicted in FIGS. 1A-B and 2A-B, but wherein the LED filament lamp comprises wireless connectivity. More specifically, the driver circuit comprises a main controller circuit in communication with a wireless receiver or transceiver. The wireless receiver is configured to receive wireless control messages by means of a wireless modality. The wireless modality may be Bluetooth, Wi-Fi, ZigBee, VLC, IR, RF, Lo-Ra, NFC, RFID, etc. The control messages may subsequently be converted, by the main controller circuit comprised by the driver circuit, to the control signal according to the invention. The driver circuit is thereby conveying a control signal to the controller arranged within the chamber.

FIG. 3 depicts schematically an embodiment of a method 30 according to the invention. The method 30 may be performed by the LED filament lamp depicted in FIG. 1 and/or FIG. 2. The method 30 comprises a step 31 of powering, by the driver circuit arranged outside the chamber, the controller via two powerlines extending through the stem. The method 30 further comprises a step 32 of conveying, by the driver circuit, a control signal to the controller via a control line extending through the stem. The method 30 further comprises a step 33 of receiving, by the controller, said control signal and controlling each of the (respective) plurality of controllable channels based on said control signal. Said control line may in some examples be at least one of the powerlines.

In some examples, the method may comprise a step of decoding the received control signal into a decoded control signal, and controlling each of the (respective) plurality of individually controllable segments based on said decoded control signal. In some examples, the method may comprise a step of transmitting, by the driver circuit, said control signal to the controller by means of Power Line Communications (PLC).

The invention claimed is:

1. A LED filament lamp comprising:
   an envelope enclosing a chamber sealed with a stem, wherein the stem extends into said chamber;
   a LED filament structure with at least two individually controllable segments;
   a controller configured to decode a received control signal into a decoded control signal and control each of the at least two individually controllable segments based on said decoded control signal, wherein the LED filament structure and the controller are arranged within the chamber;
   a driver circuit arranged outside the chamber, wherein the driver circuit comprises two powerlines extending through the stem or the envelope for powering the LED filament structure and the controller, wherein the driver circuit is configured to convey said control signal to the controller via one control line extending through the stem or the envelope; and
   wherein each segment of the at least two individually controllable segments is configured to output a different lighting characteristic, wherein the lighting characteristic is one of: a color or color temperature.

2. The LED filament lamp according to claim 1, wherein the control line is a separate control line extending through the stem.

3. The LED filament lamp according to claim 1, wherein at least one of the two powerlines is configured as the control line.

4. The LED filament lamp according to claim 3, wherein the driver circuit is configured to transmit said control signal to the controller via Power Line Communication (PLC).

5. The LED filament lamp according to claim 1, wherein the LED filament structure comprises at least two LED filaments, wherein each LED filament of the at least two LED filaments comprises a respective segment of the at least two individually controllable segments.

6. The LED filament lamp according to claim 1, wherein the LED filament structure comprises a single LED filament comprising the at least two individually controllable segments.

7. The LED filament lamp according to claim 1, wherein the lighting characteristic further includes an intensity.

8. The LED filament lamp according to claim 1, wherein the LED filament structure comprises five individually controllable segments.

9. The LED filament lamp according to claim 1, wherein the LED filament structure and the controller are mounted on the stem; or
   wherein the LED filament structure is mounted on the stem and the controller is part of the LED filament structure.

10. The LED filament lamp according to claim 1, wherein the controller is configured to determine a monitoring signal indicative of a status of at least one of the at least two controllable segments and to convey said monitoring signal via said control line to the driver circuit.

11. A luminaire comprising a socket for powering a lighting device and the LED filament lamp according to claim 1, wherein the LED filament lamp is arranged within the socket.

12. A method of driving a LED filament lamp,
   wherein the LED filament lamp comprises an envelope enclosing a chamber sealed with a stem and a LED filament structure with at least two individually controllable segments, wherein the stem extends into said chamber, and wherein the LED filament structure and the controller are arranged within the chamber;
   wherein the method comprises:
   powering, by a driver circuit arranged outside the chamber, the controller;
   conveying, by the driver circuit, a control signal to the controller via a control line extending through the stem or the envelope;
   receiving, by the controller, said control signal, decoding said control signal, and controlling each of the at least two controllable channels based on said decoded control signal; and
   wherein each segment of the at least two individually controllable segments is configured to output a different lighting characteristic, wherein the lighting characteristic is one of: a color or color temperature.

13. The method according to claim 12, wherein each segment of the at least two individually controllable segments is configured to output a different lighting characteristic; wherein the lighting characteristic is one of: a color, a color temperature, or an intensity.

14. A LED filament lamp comprising:
   an envelope enclosing a chamber sealed with a stem, wherein the stem extends into said chamber;
   a LED filament structure with at least two individually controllable segments;

a processor configured to receive a control signal and control each of the at least two individually controllable segments based on said control signal, wherein the LED filament structure and the processor are arranged within the chamber;

a driver circuit arranged outside the chamber, wherein the driver circuit comprises two powerlines extending through the stem or the envelope for powering the LED filament structure and the processor, wherein the driver circuit is configured to convey said control signal to the processor via one of the powerlines extending through the stem or the envelope; and wherein each segment of the at least two individually controllable segments is configured to output a different lighting characteristic, wherein the lighting characteristic is one of: a color or color temperature.

15. The LED filament lamp according to claim 1, further including a sensor, wherein the sensor is arranged within the chamber; and wherein the controller is configured to receive the sensor signal and control each of the at least two individually controllable segments based on said decoded control signal and said sensor signal.

16. The LED filament lamp according to claim 1, wherein the LED filament structure includes at least three individually controllable segments that are individually controlled via the one control line.

17. The LED filament lamp according to claim 14, wherein the LED filament structure includes at least three individually controllable segments that are individually controlled via the one powerline.

\* \* \* \* \*